(12) United States Patent
Etemad et al.

(10) Patent No.: US 7,796,547 B2
(45) Date of Patent: Sep. 14, 2010

(54) METHOD AND APPARATUS FOR PROVIDING INFORMATION TO MOBILE STATIONS IN INACTIVE STATES

(75) Inventors: Kamran Etemad, Potomac, MD (US); Masoud Olfat, Clarksvillle, MD (US)

(73) Assignee: Nextel Communications Inc., Reston, VA (US)

( * ) Notice: Subject to any disclaimer, the term of this patent is extended or adjusted under 35 U.S.C. 154(b) by 879 days.

(21) Appl. No.: 11/191,062

(22) Filed: Jul. 28, 2005

(65) Prior Publication Data

US 2006/0029011 A1    Feb. 9, 2006

Related U.S. Application Data

(60) Provisional application No. 60/599,061, filed on Aug. 6, 2004, provisional application No. 60/599,918, filed on Aug. 10, 2004, provisional application No. 60/636,540, filed on Dec. 17, 2004.

(51) Int. Cl.
*H04W 4/00* (2009.01)

(52) U.S. Cl. .................. 370/328; 370/338; 370/345; 370/389; 370/412; 455/574

(58) Field of Classification Search ............... 370/311, 370/328, 331, 318, 338, 477, 412, 345, 352, 370/400, 389; 455/574
See application file for complete search history.

(56) References Cited

U.S. PATENT DOCUMENTS 6,144,653 A * 11/2000 Persson et al. ............. 370/337
6,157,845 A * 12/2000 Henry et al. .............. 455/426.1
6,477,382 B1 * 11/2002 Mansfield et al. ........... 455/458
6,628,946 B1 * 9/2003 Wiberg et al. .............. 455/434
6,693,887 B2   2/2004 Stanwood et al.
6,728,300 B1   4/2004 Sarkar et al.
6,771,660 B1   8/2004 Bourlas et al.
6,879,573 B1 * 4/2005 Huo ......................... 370/337
2003/0162549 A1 * 8/2003 Carlsson .................... 455/456
2004/0170148 A1 * 9/2004 Parkkinen et al. .......... 370/337

OTHER PUBLICATIONS

International Search Report and Written Opinion for PCT/US05/27740 dated Feb. 23, 2007.

* cited by examiner

*Primary Examiner*—Dwayne D Bost
*Assistant Examiner*—Inder P Mehra

(57) ABSTRACT

Methods and apparatus for notifying mobile stations in an inactive state of the presence of uplink or downlink channel configuration, broadcast system updates, traffic channel allocations and paging messages are provided. The notification can be provided in an information element in the same channel as the frame, or in a different channel. The information element identifies a subsequent frame which includes broadcast or configuration changes. The notifications for traffic channel allocations can include a first field, which identifies whether there are any traffic channel allocations for any sleep mode mobile station, and a second field for identifying the particular sleep mode mobile stations which are to receive traffic channel allocations. Notifications for paging messages can include a field, which identifies whether there are any paging messages for any idle mode mobile stations, and use second field to identify the particular idle mode mobile stations, which are to receive the paging messages.

28 Claims, 9 Drawing Sheets

METHOD AND APPARATUS FOR PROVIDING INFORMATION TO MOBILE STATIONS IN INACTIVE STATES

CROSS-REFERENCE TO RELATED APPLICATIONS

This application claims the benefit of U.S. Provisional Application Nos. 60/599,061, filed Aug. 6, 2004, 60/599,918, filed Aug. 10, 2004, and 60/636,540, filed Dec. 17, 2004, the entire disclosure of these applications are herein expressly incorporated by reference.

BACKGROUND OF THE INVENTION

The IEEE 802.16e standard supports mobility, paging and fast call setup for a variety of terminals, including battery powered mobile stations. The mobile stations can include cellular telephones, personal digital assistants (PDAs), computers equipped with wireless transceivers (such as integrated transceivers or transceivers on PCMCIA cards), pagers, and the like.

FIG. 1 illustrates an exemplary orthogonal frequency division multiple access (OFDMA) frame with Time Division Duplexing (TDD) as the main physical layer (PHY) mode used for mobility within IEEE 802.16e. The horizontal axis represents time, while the vertical axis represents frequency tones or subcarriers. An OFDMA frame in a TDD system is divided into downlink and uplink subframes. Between the downlink and uplink subframes of a particular frame is a transmit transmission gap (TTG), which provides time for a base station to transition from a transmission mode to a receive mode and mobile stations to transition from a receive mode to a transmission mode. A receive transmission gap (RTG) is provided between an uplink subframe of one frame and the downlink subframe of a subsequent frame. The RTG provides base stations time to transition from a receive mode to a transmission mode and mobile stations to transition from a transmission mode to a receive mode.

In the frame of FIG. 1, the downlink subframe includes a preamble, frame control header (FCH), downlink MAP (DL-MAP), uplink MAP (UL-MAP) and downlink data channels. The preamble is used by mobile stations for cell acquisition and frame synchronization. The FCH is a broadcast channel located right after preamble, and includes information indicating the size of DL-MAP, repetition coding and forward error correction (FEC) coding used in DL-MAP, and other information related to the current frame. The DL-MAP, which follows immediately after FCH, includes a number of information elements (IEs), which define the usage of the downlink data channels and includes information such as frame synchronization, paging messages, downlink channel allocations and configuration change counts. The UL-MAP includes a number of information elements, which define the usage of the uplink data channels, and includes information such as uplink channel allocations, and uplink configuration change counts. The downlink data channels are used to transport data from a base station to other network nodes, e.g., fixed or mobile stations. The uplink subframe includes the uplink data channels, as well as ranging and uplink control channels.

The IEEE 802.16e standard defines active and non-active states for mobile stations. Idle and sleep modes are two non-active states defined in the IEEE 802.16 standard. While in idle or sleep modes, a mobile station will alternate between an unavailability interval, where the mobile station will not receive messages from the network, and an availability interval, where the mobile station will monitor and receive messages from the network.

Idle mode allows a mobile station, while traversing an air link environment populated by multiple base stations, to become periodically available for downlink broadcast traffic messaging without registration at a specific base station. While in the idle mode, a mobile station does not have to satisfy active state requirements, including handover. By restricting mobile station activity to scanning during availability intervals for downlink broadcast traffic messaging, idle mode allows the mobile station to conserve power and operational resources. Idle mode benefits the network and base stations by providing a simple method for alerting mobile stations to pending downlink traffic, and by eliminating air-interface and network handover traffic from an essentially inactive mobile station.

Mobile stations in sleep mode negotiate unavailability intervals with the network. During a mobile station's unavailability interval, the base station may buffer (or it may drop) medium access control (MAC) packets addressed to unicast connections toward the sleep mode mobile station. Additionally, the base station may choose to delay transmission of packets addressed to multicast connections until an availability interval, common for all mobile stations participating in the multicast connection. For each mobile station involved in a multicast connection, the base station maintains one or several contexts, each related to a certain Power Saving Class. A Power Saving Class is a group of connection identifications (CIDs) used by mobile stations which have common demand properties.

During availability intervals, a sleep mode mobile station is expected to receive all downlink transmissions, as in the active state. In addition, the mobile station examines the downlink channel descriptor (DCD) and uplink channel descriptor (UCD) change counts to determine whether there will be a change in the downlink or uplink portion of the frame, and the frame number of the DL-MAP PHY Synchronization Field, to verify synchronization with the base station. Sleep mode minimizes mobile station power usage, and decreases usage of base station air-interface resources.

As discussed above, during availability intervals, mobile stations in inactive states must parse through the entire set of messages in the downlink and uplink MAP to determine if there are any paging messages (for idle mode mobile stations), traffic channel allocations (for sleep mode mobile stations), or whether there are any configuration changes (i.e., DCD or UCD changes).

Parsing all of the messages in the DL- and UL-MAP requires considerable amount of processing at the physical layer (PHY), such as fast Fourier transform (FFT) operation, demodulation, de-interleaving, decoding, as well as MAC layer processing. Additionally, the size of the messages can be quite large. For example, the IEEE 802.16e standard allows transmission of 104 bits of broadcast information, several extended information elements, and for many active users several CID allocations. These CID allocations can be basic CIDs, primary or secondary CIDs, and traffic CIDs. Accordingly, a mobile station may parse through the entire set of messages in the DL- and UL-MAP and determine that there are no messages for the mobile station in these fields. The process of parsing the entire downlink and uplink MAP can consume considerable amount of power. Because mobile stations have a limited power supply, such as a rechargeable battery, parsing the entire set of messages will decrease the operating time of the mobile station, and in turn, require the battery to be recharged more often. Accordingly, it would be desirable to minimize the amount of processes for idle and sleep mode mobile stations.

SUMMARY OF THE INVENTION

In view of the above-identified and other deficiencies of conventional procedures for mobile stations in an inactive state, the present invention provides methods and apparatus for reducing processing time for such mobile stations. Specifically, the present invention provides fast and efficient techniques for notifying mobile stations in inactive states of information transmitted in a frame. A base station determines whether particular broadcast information will be transmitted in the frame and whether information for at least one of the mobile stations in the inactive state will be transmitted in the frame. The base station then forms an information element notifying mobile stations in the inactive state whether the particular broadcast information or the information for the at least one of the mobile stations in the inactive state will be transmitted in the frame. The base station then broadcasts the information element.

In accordance with exemplary embodiments of the present invention, the broadcast information can be a change in a downlink channel descriptor (DCD) and/or an uplink channel descriptor (UCD). The notification can be provided using a configuration change counter, such that a change in a value of the counter indicates that an upcoming frame contains a change in the DCD and/or the UCD. A subsequent field in the message can include an identification of the particular frame containing the configuration change for the DCD and/or the UCD.

In accordance with another exemplary aspect of the present invention, the broadcast information can be a broadcast system update. The notification of a broadcast system update can include an indication of the broadcast system update type, and the frame in which the broadcast system update will be transmitted.

In accordance with another exemplary aspect of the present invention, the information for at least one of the mobile stations in the inactive state can be a traffic channel allocation for one of a plurality of sleep mode mobile stations. If there is a notification that there is a traffic channel allocation for one of the plurality of sleep mode mobile stations, the notification will also include a binary indication of which particular one of the plurality of sleep mode mobile stations is being provided with a traffic channel allocation. This binary indication is obtained by performing a hashing algorithm based on a mobile station's medium access control identification (MAC-ID).

In accordance with yet another aspect of the present invention, the information for at least one of the mobile stations in the inactive state can be a paging message for one of a plurality of idle mode mobile stations. If there is a notification of a paging message for one of the plurality of idle mode mobile stations, the notification also includes a binary indication of which particular mobile station is being provided with a paging message. This binary indication is obtained by performing a hashing algorithm based on a mobile station's MAC-ID.

Accordingly, by examining the indications discussed above, mobile stations in an inactive state, such as in idle or sleep modes, can quickly determine whether a particular frame includes relevant information. If the particular frame does not include relevant information, the mobile station can discontinue processing the remainder of the frame, thereby reducing processing power and power consumption.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
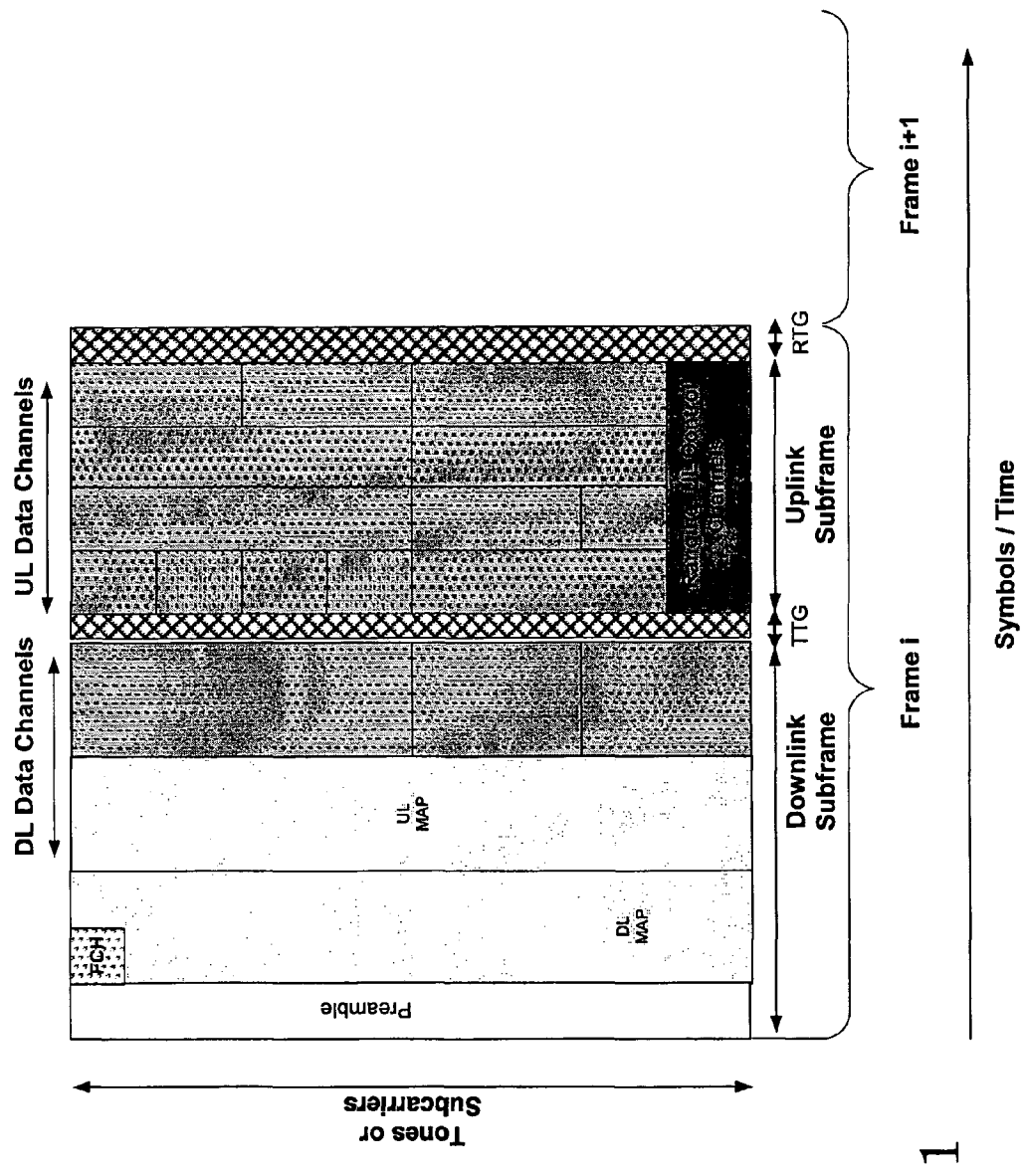
FIG. 1 illustrates an exemplary OFDMA frame in a TDD system.
Figure 2:
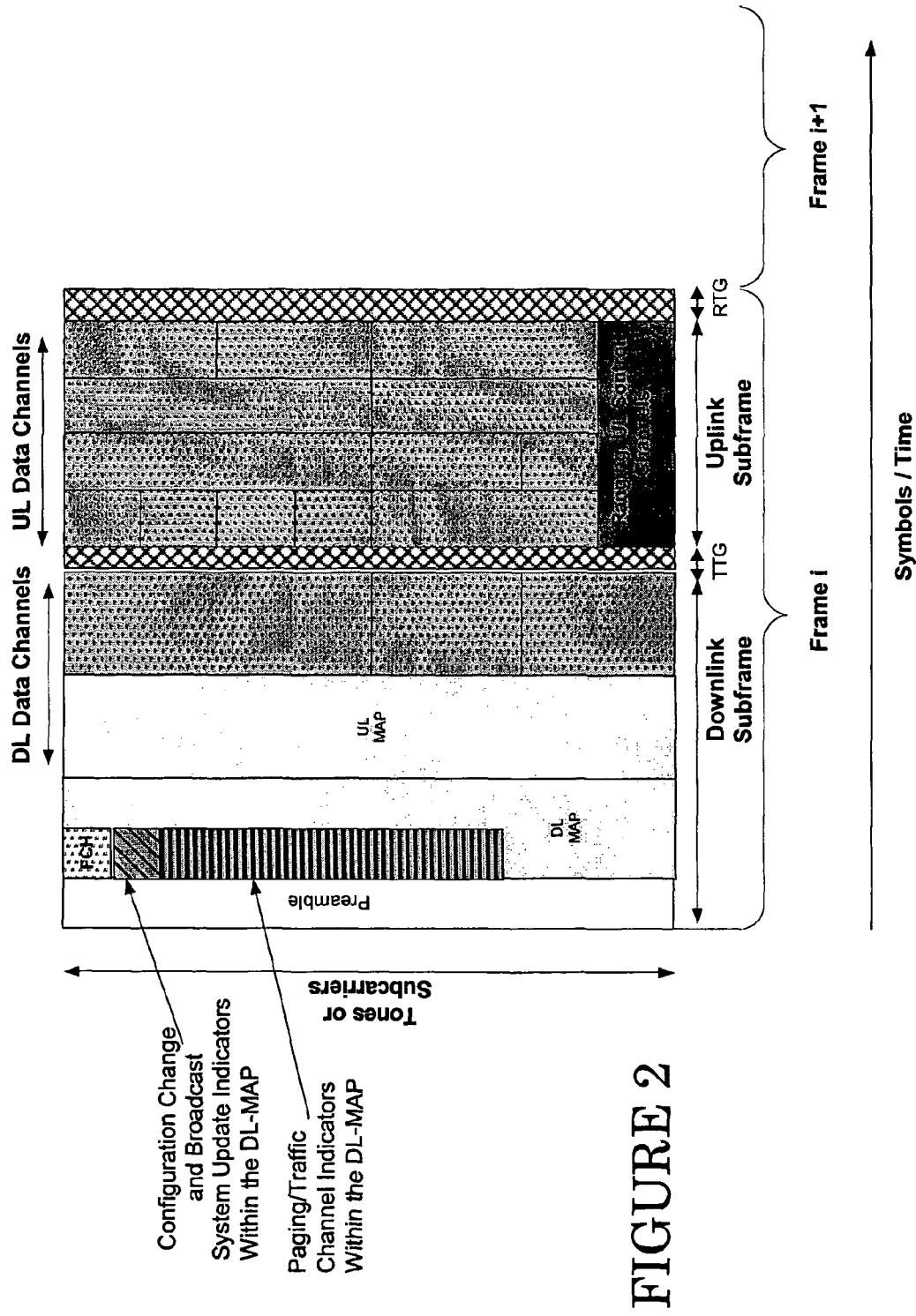
FIG. 2 illustrates an exemplary OFDMA frame in accordance with the present invention.

FIG. 2 illustrates an exemplary OFDMA frame in accordance with the present invention. As illustrated in FIG. 2, in the portion of the DL-MAP immediately following the FCH, an information element is provided, which indicates whether the current or subsequent frames include configuration changes, broadcast system updates, paging messages and/or traffic channel allocations. As will be described in more detail below, idle and sleep mode mobile stations can examine this information element to quickly determine whether it is necessary for a particular idle or sleep mode mobile station to read the remainder of the frame and/or subsequent frames.

Figure 3:
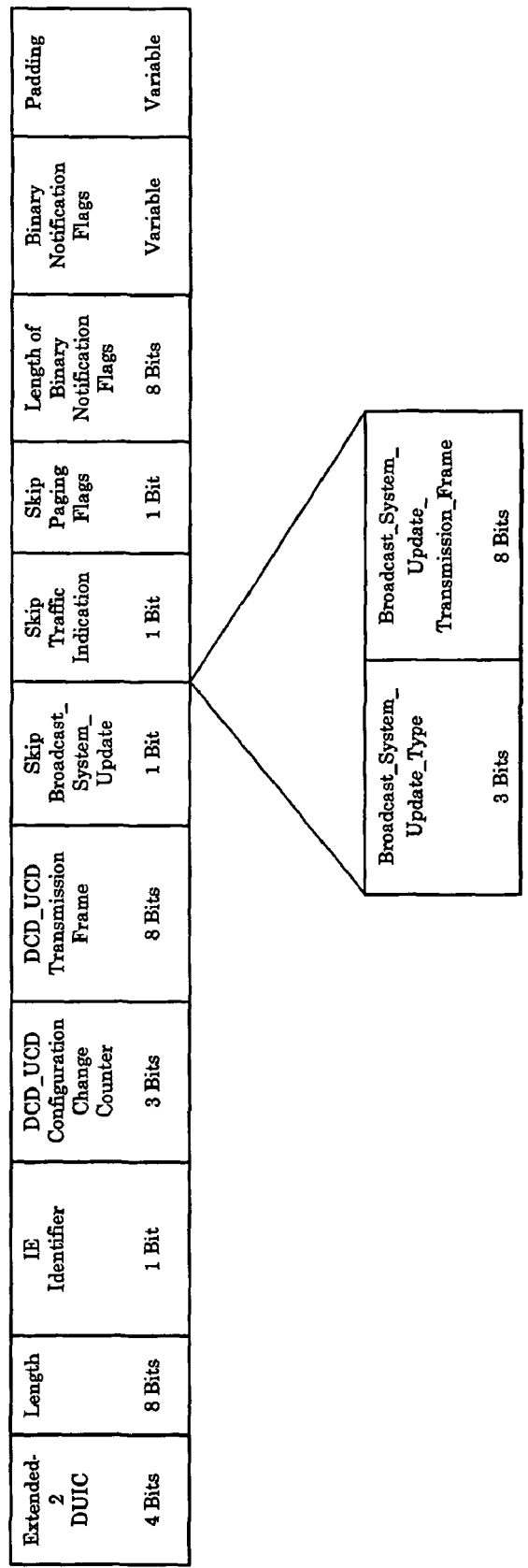
FIG. 3 illustrates an exemplary information element for notifying mobile stations in an inactive state whether the remainder of the frame contains information for one of a plurality of idle or sleep mode mobile stations.

FIG. 3 illustrates an exemplary information element for notifying mobile stations in an inactive state of information transmitted in a frame in accordance with the present invention. This information element is incorporated as a broadcast control MAC message in the DL-MAP, as illustrated in FIG. 2. When this information element is transmitted, it can be placed at the earliest part of the downlink subframe, e.g., at the beginning of the DL-MAP, following the critical broadcast control messages. Early presence of the notification message allows mobile stations in an inactive state to quickly determine the need to interpret and decode the remainder of the DL-MAP.

The first field is a four-bit extended-2 downlink interval usage count (DIUC), which indicates the information element type. The Extended-2 DIUC was introduced in the IEEE 802.16 standard to allow more extended Information Elements (IEs) to be introduced, and at the same time, allow larger sizes for each extended IE, as compared to the extended DIUC, which limited the size of the IE to 16 bytes. The length of the information element is indicated in a four bit Length field. An Information Element Identifier field is set to '0' to indicate that this information element notifies mobile stations in an inactive state of information transmitted in the current or subsequent frames.

In order to indicate changes in the downlink channel descriptor (DCD) and/or the uplink channel descriptor (UCD), a three bit DCD_UCD Configuration Change Counter field is provided. Specifically, this field includes a counter value, which is stored by mobile stations in an inactive state. When a mobile station notices a change in this counter value, the mobile station will recognize that a subsequent frame includes a change in the DCD and/or the UCD. The subsequent frame containing the change is indicated in the DCD_UCD Transmission Frame field. Specifically, this field includes the least significant eight bits of the frame number of the next frame containing a DCD and/or the UCD configuration change.

By providing a field which identifies the frame containing the DCD or UCD configuration changes, the present invention can reduce power consumption for mobile stations in an inactive state. Specifically, in accordance with conventional procedures, after a mobile station in an inactive state detects a change in the configuration change counter of the DL-MAP, the mobile station must decode the beginning of each and every frame looking for the DCD and/or UCD configuration changes, in order to regain burst mode synch. Accordingly, by providing the frame number of the next frame which includes a DCD and/or UCD configuration change, the present invention removes the requirement for mobile stations to search each frame for DCD and/or UCD configuration changes. Mobile stations in an inactive state can continue their mode of operation without the burden of unnecessarily decoding the beginning of frames outside of their availability interval, awakening when the prescribed DCD/UCD transmission frame time arrives, decoding the transmission, and becoming again immediately available to return to normal operation with minimal synchronization. Accordingly, mobile stations in an inactive state remain constantly updated to DCD and/or UCD configuration changes with the minimum of frame decoding requirements.

The information element includes a one bit Skip Broadcast System Update field, which indicates whether an upcoming frame includes a broadcast system update. When this field includes a negative value, e.g., a value of zero, then two additional fields follow immediately after this field. The first field is a Broadcast_System_Update_Type, which includes three bits to indicate the type of upcoming broadcast system update. This type can include a value of 000 for a new neighbour advertisement update, 001 for emergency services messages and the remaining values can be reserved for other uses. Emergency services messages can include location specific emergency advisories, such as avalanche, flood, tornado, Amber Alert, or the like. The second field is the Broadcast_System_Update_Transmission_Frame field, which includes the least significant eight bits of the frame number of the next broadcast system update transmission.

The next two fields are the Skip Traffic Indication and Skip Paging Flags fields. These fields include an indication of whether there are any traffic channel allocations, for any sleep mode mobile station, or paging messages, for any idle mode mobile stations. Accordingly, when the Skip Traffic Indication includes a value of '1', sleep mode mobile stations can skip the remainder of the information element, as this indicates that the remainder of the information element does not include traffic indications for any sleep mode mobile stations. Similarly, when the Skip Paging Flags field includes a value of '1', idle mode mobile stations can skip the remainder of the information element, as the information element contains no additional information for mobile stations in idle mode.

If the Skip Traffic Indication or Skip Paging Flags fields include a value of "0", binary notifications are provided to indicate which sleep or idle mode mobile stations are to receive a traffic channel allocation or a paging message. Specifically, following the Skip Paging Flags field are the Length Binary of Notification Flags and the Binary Notification Flags fields. The Length of Binary Notification Flags field includes an eight bit value indicating the length of the Binary Notification Flags field. The Binary Notification Flags field is used for notifications of both sleep and idle mode mobile stations. Specifically, individual binary values in this field are set to '1' if any mobile station that would hash to that flag index location is intended to be notified of a pending downlink or uplink traffic allocation in the current frame, or if the base station is instructing a sleep mode mobile station with an operating Power Savings Class 1 to discontinue sleep mode for that Power Savings Class. The Power Savings Class of a connection of a mobile station in sleep mode is determined by the demand properties of that connection, including Quality of Service (QoS) requirements, interval between allocations, procedures of activation and deactivation, and policies of the mobile station's availability for data transmission. Power Savings Class 1 is used mainly for connections of the Best Efforts (BE) and non-real time, variable rate (nrt-VR) type. The Padding field is a variable bit field which is used to ensure that the information element size is an integer number of bytes.

The hashing can be based on mobile station's MAC address represented in modulo N, when N is the total number of bits in the binary notification flag field. The value of N shall be calculated based on the following:

$$N = \text{Length of Binary Notification Flags} \times 8$$

If the hashed Binary Notification Flag value is '0', indicating no downlink or uplink transmission activity scheduled for the mobile station in this frame, the mobile station may discontinue processing the remainder of this frame. If the value read is '1', the mobile station shall continue decoding the current frame looking for traffic allocation messages (if the mobile station is in a sleep mode), or paging messages (if the mobile station is in an idle mode). This process shall be repeated for each frame within the mobile station's availability interval. Sleep mode mobile stations can employ other hashing methods using, for example, the mobile station's basic CID's.

The size of the vector containing binary notification flags is set based on the expected number of idle and sleep users and a probability false alarm. Because the present invention uses a hashing algorithm, the number of bits can be smaller than the number of idle and sleep users. Although the basic hashing algorithm described above could yield a very small number of false positive indications, the probability of false positives is extremely small and the penalty of outcome is very minor. Specifically, if a mobile station's determination is in fact a false positive, the mobile station would continue to read the DL-MAP and possibly other messages, whereby it would learn that no action was required, and would return to its mode function without impediment to its current operation. In other words, no state changes are affected through the information element of the present invention, only the direction to the mobile station to 'pay attention' and continue decoding the current frame at least through the remainder of the DL-MAP.

Depending on the repetition and coding used for the DL-MAP, the information element of FIG. 3 can be provided as a single symbol, and can be repeated on multiple symbols to provide frequency diversity and proper error correction capability. The insertion of a PHY channel for these indicators allows the mobile station to perform only FFT operation on these symbols, omitting any remaining PHY layer processing and all the MAC layer processing. When there are no configuration changes, pages, broadcast services, or channel allocations in the frame, this reduced processing can save a considerable amount of power, and allow longer standby time for battery-powered mobile station. Because mobile stations spend a majority of their time, e.g., approximately 90%, in inactive states, this reduced processing has a major impact on their overall standby and talk time.

Figure 4:
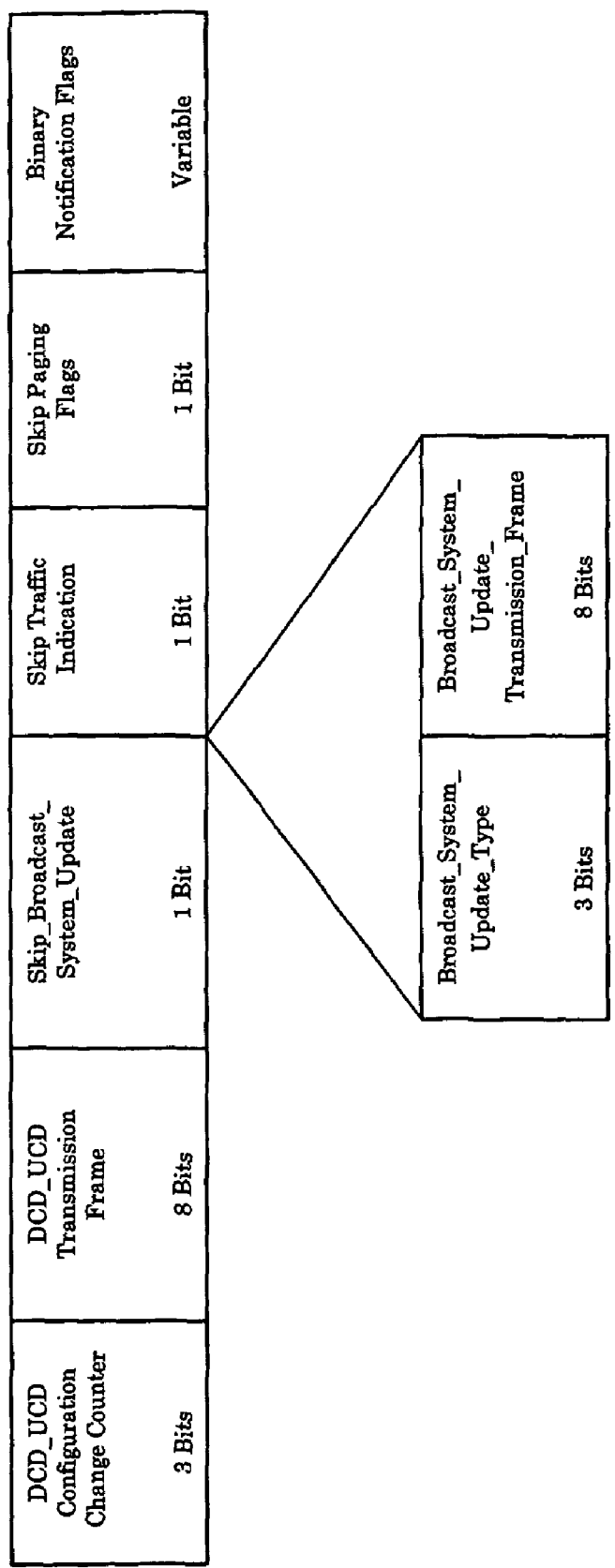
FIG. 4 illustrates an exemplary physical channel for notifying mobile stations in an inactive state whether a frame includes information for one of a plurality idle or sleep mode mobile stations.

FIG. 4 illustrates an exemplary dedicated physical channel for notifying mobile stations in an inactive state whether a frame includes information for one of a plurality of idle or sleep mode mobile stations. This physical channel includes a three bit DCD_UCD Configuration Change Counter, eight bit DCD_UCD Transmission Frame field, one bit Skip_Broadcast_System_Update, one bit Skip Traffic Indication, one bit Skip Paging Flags field, and variable length Binary Notification Flags field. All of the aforementioned fields are used in the same manner as described above in connection with FIG. 3. Similarly, as discussed above in connection with FIG. 3, when the Skip_Broadcast_System_Update field is set to a negative indication, this field is followed by a three bit Broadcast_System_Update_Type field, and an eight bit Broadcast_System_Update Transmission_Frame field, both of which are used in the same manner as described above in connection with FIG. 3. Because the size of the DL-MAP is given in the downlink frame prefix (DLFP), the mobile can quickly jump to the beginning of this dedicated physical channel without PHY and MAC processing of DL-MAP.

The dedicated physical channel illustrated in FIG. 4 can employ a default mandatory tail biting convolutional coding with rate ½ and QPSK modulation. The use of the physical channel for providing indications can be supported as an optional capability and the presence, position and the size of this channel can be indicated, e.g. 64, 128 or 256 tones, on the FCH channel, e.g. using some of reserved bits in the DLFP portion of the FCH.

Figure 5:
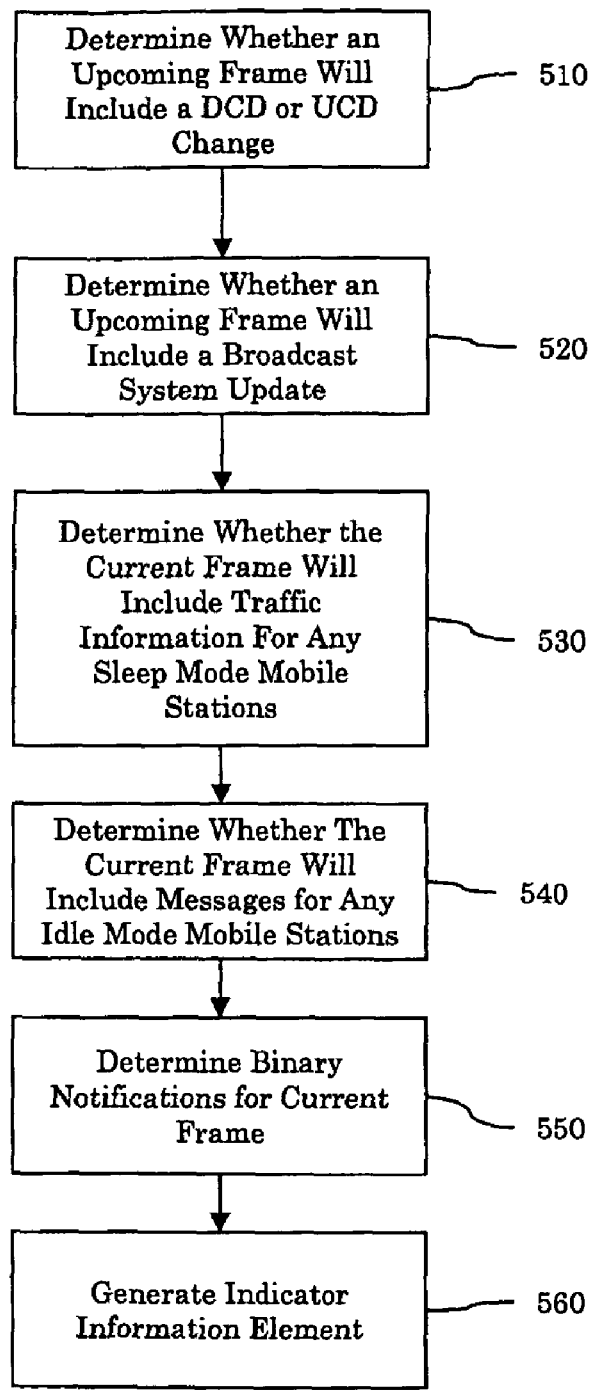
FIG. 5 illustrates an exemplary method for a base station generating a frame in accordance with the present invention.

FIG. 5 illustrates an exemplary method for a base station to generate an information element for notifying mobile stations in an inactive state of information transmitted in a frame in accordance with the present invention. The base station determines whether a subsequent frame will include a DCD and/or UCD configuration change (step 510). If a subsequent frame will include a DCD and/or UCD configuration change, the base station will change the value of the DCD_UCD Configuration Change Counter, and inserts the last eight least significant bits of the transmission frame including such a change into the DCD_UCD Transmission Frame field. If the base station determines that an upcoming frame will include a broadcast system update, then the base station will include such an indication in the Skip Broadcast System Update field, and will add Broadcast_System_Update_Type and Broadcast_System_Update_Transmission_Frame fields to the message (step 520). If the current frame does not include traffic information for any sleep mode mobile stations, then the Skip Traffic Indications field is set to one, otherwise it is set to zero (step 530). Similarly, if the current frame includes page messages for any idle mode mobile stations, the base station sets the Skip Paging Flags field to a negative indication, e.g., a value of zero (step 540).

Based on the traffic indications for sleep mode mobile stations and the paging messages for idle mode mobile stations, the base station determines the binary notifications for the current frame, by setting the appropriate hashing for the appropriate mobile stations' addresses (step 550). The base station then generates the indicator portion of the frame, using the determinations described above (step 560).

Figure 6A:
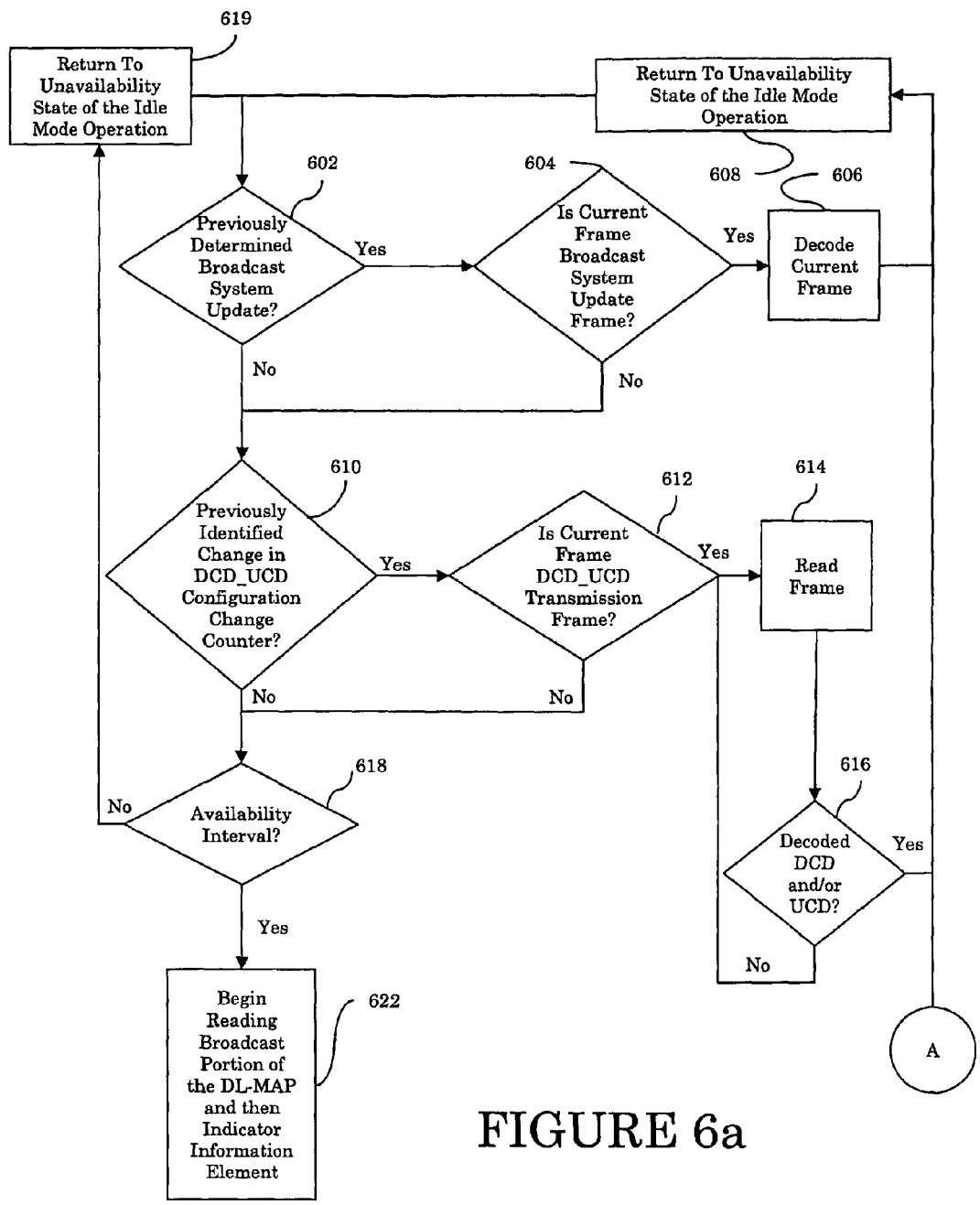
FIGS. 6a and 6b illustrate an exemplary method for an idle mode mobile station in accordance with exemplary embodiments of the present invention.
Figure 6B:
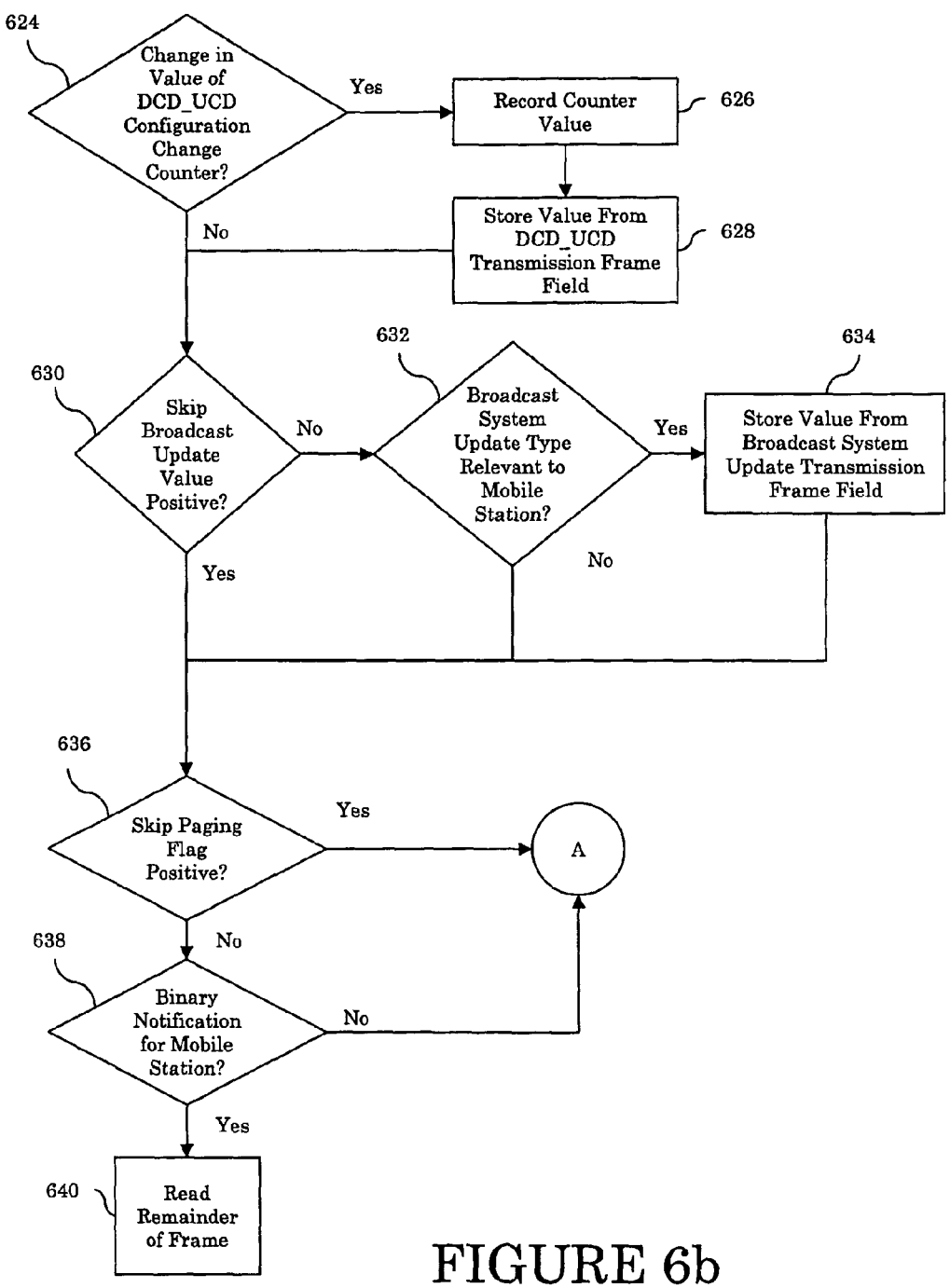

FIGS. 6a and 6b illustrate an exemplary method for an idle mode mobile station in accordance with exemplary embodiments of the present invention. Initially, an idle mode mobile station determines whether it has previously determined that an upcoming frame would contain a broadcast system update (step 602). If the mobile station has previously determined that an upcoming frame includes a broadcast system update ("Yes" path out of decision step 602), then the mobile station determines whether the current frame is the frame with the broadcast system update (step 604). If the current frame is the frame with the broadcast system update ("Yes" path out of decision step 604), then the mobile station decodes the current frame (step 606) and returns to unavailability state of the idle mode operation (step 608).

If the mobile station has not previously determined that an upcoming frame will include a broadcast system update ("No" path out of decision step 602), or if the current frame is not the frame containing the broadcast system update ("No" path out of decision step 604), then the mobile station determines whether it has previously identified a change in the DCD_UCD Configuration Change Counter (step 610). If the mobile station has previously identified a change in the DCD_UCD Configuration Change Counter ("Yes" path out of decision step 610), then the mobile station determines whether the current frame is the DCD_UCD transmission frame (step 612). If the current frame is the DCD_UCD transmission frame ("Yes" path out of decision step 612), then the mobile station reads the current transmission frame (step 614) and determines whether it has decoded the DCD and/or UCD (step 616). If the mobile station has not decoded the DCD and/or the UCD ("No" path out of decision step 616), then the mobile station continues to read frames until it has decoded the DCD and/or the UCD. If, however, the mobile station has decoded DCD and/or the UCD ("Yes" path out of decision step 616), then the mobile station returns to the unavailability state of the idle mode operation (step 608).

If the mobile station has not previously determined a change in the DCD_UCD configuration change counter ("No" path out of decision step 610) or if the current frame is not the frame including the DCD and/or UCD configuration changes ("No" path out of decision step 612), then the mobile station determines whether the current time period corresponds to the mobile station's availability interval (step 618). If the current time period does not correspond to the mobile station's availability interval ("No" path out of decision step 618), then the mobile station returns to the unavailability state of the idle mode operation (step 619). If, however, the current time period corresponds to the mobile station's availability interval ("Yes" path out of decision step 618), then the mobile station begins reading the broadcast portion of the DL-MAP and then the indicator information element (step 622).

FIG. 6b illustrates an exemplary method for a mobile station reading the indicator information element in accordance with the present invention. The mobile station reads the DCD_UCD Configuration Change Counter field and determines whether there is a change in the counter value from its previous reading of the field (step 624). If there is a change in value ("Yes" path out of decision step 624), then the mobile station records the counter value (step 626) and stores the value from the DCD_UCD Transmission Frame field (step 628).

If there is not a change in the value of the DCD_UCD Configuration Change Counter ("No" path out of decision step 624), or after the mobile station has stored the value in the DCD_UCD Transmission Frame field (step 628), then the mobile station determines whether the value in the Skip Broadcast Update field is positive (step 630). If the value is negative ("No" path out of decision step 630), then the mobile station reads the Broadcast_System_Update_Type field to determine whether it is a relevant update type for the mobile station (step 632). If the Broadcast System Update Type is relevant to the mobile station ("Yes" path out of decision step 632), then the mobile station stores the value from the Broadcast_System_Update_Transmission_Frame field (step 634).

If the Skip Broadcast Update value was positive ("Yes" path out of decision step 630), the Broadcast System Update Type is not relevant to the mobile station ("No" path out of decision step 632), or after the mobile station has stored the value in the Broadcast_System_Update_Transmission_Frame field (step 634), then the mobile station determines whether the Skip Paging Flags field contains a positive value (step 636). If the Skip Paging Flags field contains a positive value ("Yes" path out of the decision step 636), then the mobile station returns to the unavailability state of the idle mode operation (step 608). If, however, the Skip Paging Flag field includes a negative value ("No" path out of decision step 636), then the mobile station determines whether there is a binary notification for the particular mobile station (step 638). If there is not a binary notification for the mobile station ("No" path out of decision step 638), then the mobile station returns to the unavailability state of the idle mode operation (step 608). If, however, there is a binary notification for the mobile station ("Yes" path out of decision step 638), then the mobile station reads the remainder of the frame (step 640).

Figure 7A:
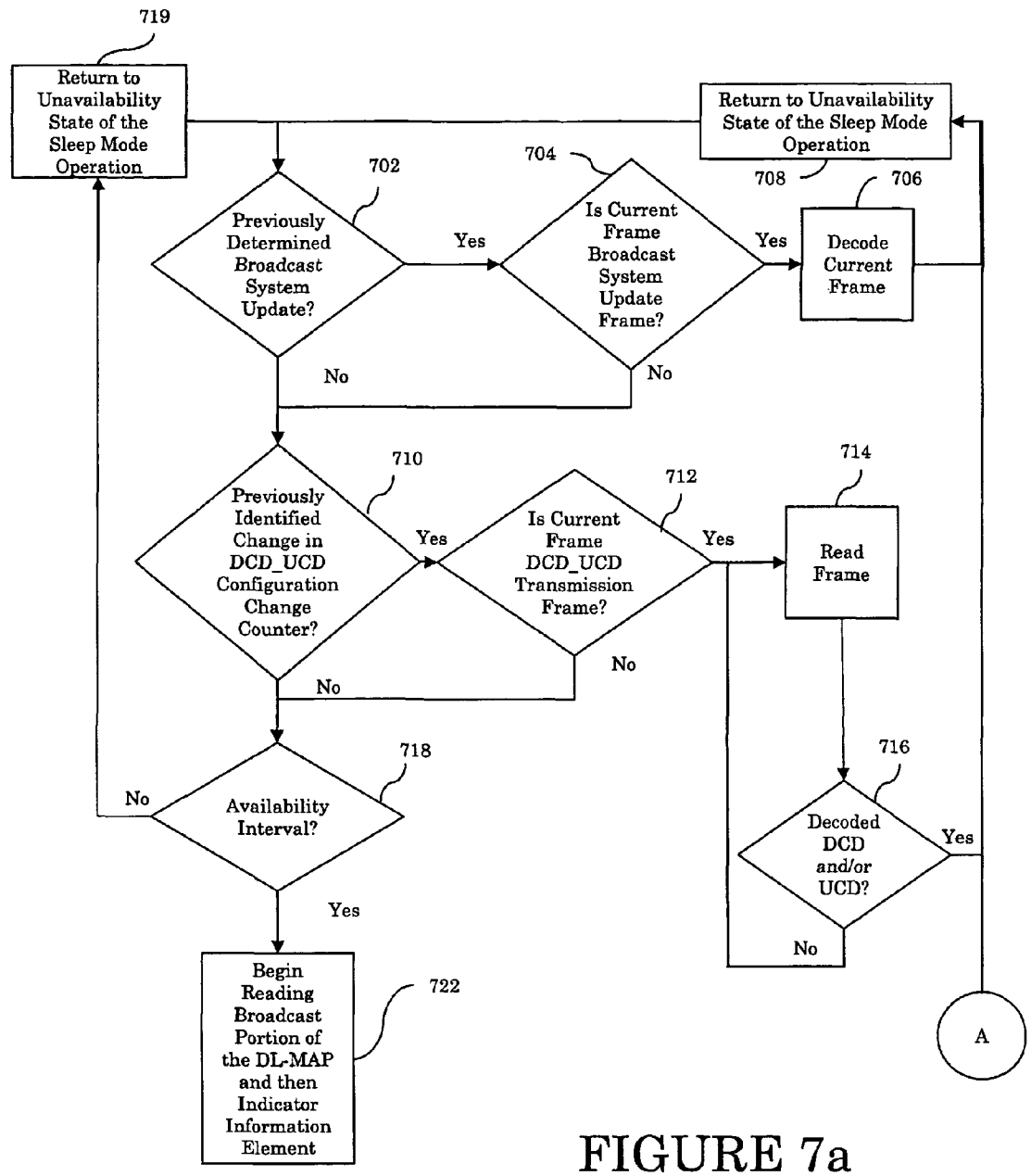
FIGS. 7a and 7b illustrate an exemplary method for a sleep mode mobile station in accordance with the present invention.
Figure 7B:
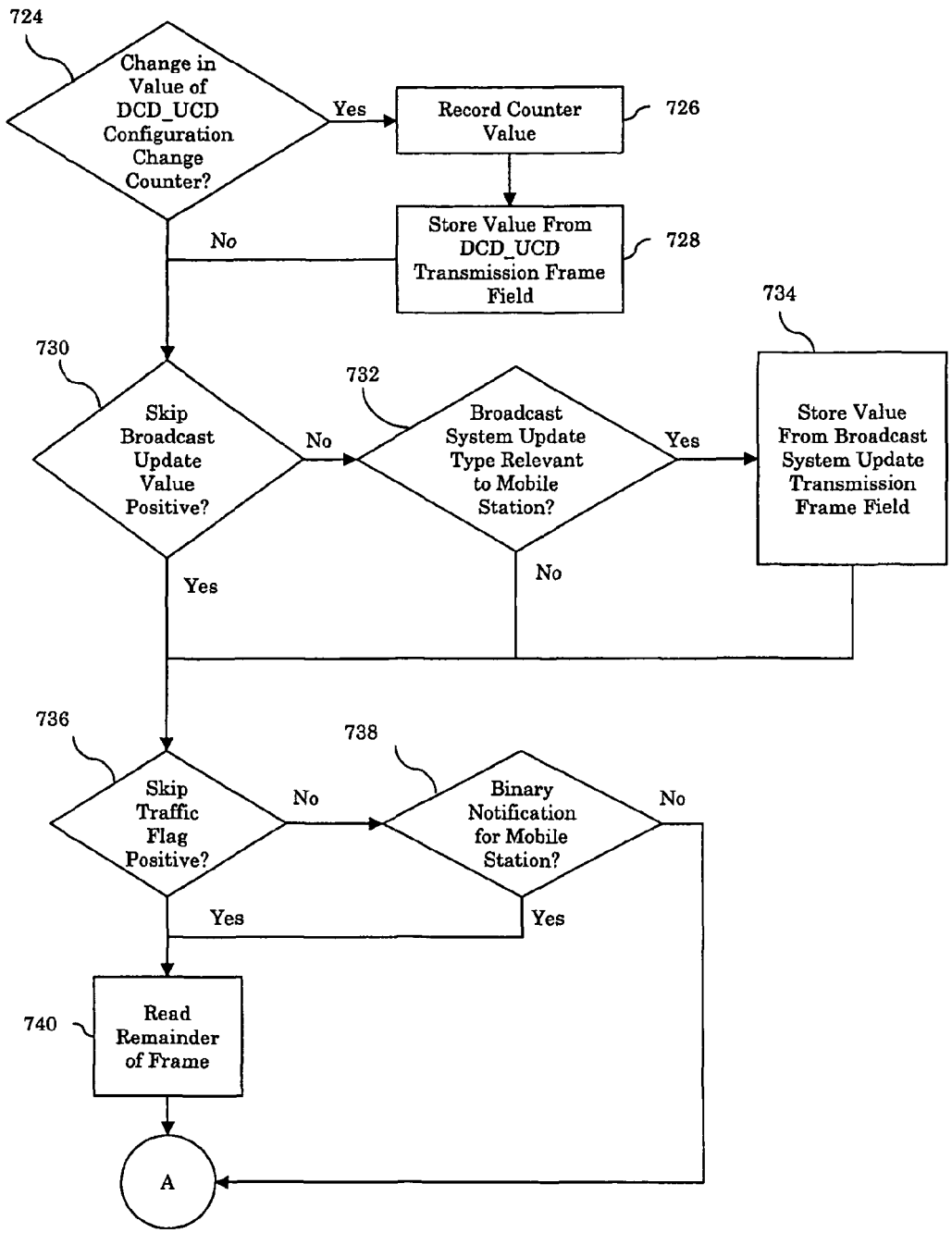

FIGS. 7a and 7b illustrate an exemplary method for a sleep mode mobile station in accordance with exemplary embodiments of the present invention. Initially, a sleep mode mobile station determines whether it has previously determined that an upcoming frame would contain a broadcast system update (step 702). If the mobile station has previously determined that an upcoming frame includes a broadcast system update ("Yes" path out of decision step 702), then the mobile station determines whether the current frame is the frame with the broadcast system update (step 704). If the current frame is the frame with the broadcast system update ("Yes" path out of decision step 704), then the mobile station decodes the current frame (step 706) and returns to unavailability state of the sleep mode operation (step 708).

If the mobile station has not previously determined that an upcoming frame will include a broadcast system update ("No" path out of decision step 702), or if the current frame is not the frame containing the broadcast system update ("No" path out of decision step 704), then the mobile station determines whether it has previously identified a change in the DCD_UCD Configuration Change Counter (step 710). If the mobile station has previously identified a change in the DCD_UCD Configuration Change Counter ("Yes" path out of decision step 710), then the mobile station determines whether the current frame is the DCD_UCD transmission frame (step 712). If the current frame is the DCD_UCD transmission frame ("Yes" path out of decision step 712), then the mobile station reads the current transmission frame (step 714) and determines whether it has decoded the DCD and/or UCD (step 716). If the mobile station has not decoded the DCD and/or the UCD ("No" path out of decision step 716), then the mobile station continues to read frames until it has decoded the DCD and/or the UCD. If, however, the mobile station has decoded DCD and/or the UCD ("Yes" path out of decision step 716), then the mobile station returns to the unavailability state of the sleep mode operation (step 708).

If the mobile station has not previously identified a change in the DCD_UCD configuration change counter ("No" path out of decision step 710) or if the current frame is not the DCD_UCD transmission frame ("No" path out of decision step 712), then the mobile station determines whether the current time period corresponds to the mobile station's availability interval (step 718). If the current time period does not correspond to the mobile station's availability interval ("No" path out of decision step 718), then the mobile station returns to the unavailability state of sleep mode operation (step 719). If, however, the current time period corresponds to the mobile station's availability interval ("Yes" path out of decision step 718), then the mobile station begins reading the broadcast portion of the DL-MAP and then the indicator information element (step 722).

FIG. 7b illustrates an exemplary method for a mobile station reading the indicator information element in accordance with the present invention. The mobile station reads the DCD_UCD Configuration Change Counter field and determines whether there is a change in the counter value from its previous reading of the field (step 724). If there is a change in value ("Yes" path out of decision step 724), then the mobile station records the counter value (step 726) and stores the value in the DCD_UCD Transmission Frame field (step 728).

If there is not a change in the value of the DCD_UCD Configuration Change Counter ("No" path out of decision step 724), or after the mobile station has stored the value from the DCD_UCD Transmission Frame field (step 728), then the mobile station determines whether the value in the Skip Broadcast Update field is positive (step 730). If the value is negative ("No" path out of decision step 730), then the mobile station reads the Broadcast_System_Update_Type field to determine whether it is a relevant update type for the mobile station (step 732). If the Broadcast System Update Type is relevant to the mobile station ("Yes" path out of decision step 732), then the mobile station stores the value from the Broadcast_System_Update_Transmission_Frame field (step 734).

If the Skip Broadcast Update value was positive ("Yes" path out of decision step 730), the Broadcast System Update Type is not relevant to the mobile station ("No" path out of decision step 732), or after the mobile station has stored the value in the Broadcast_System_Update_Transmission_Frame field (step 734), then the mobile station determines whether the Skip Traffic Flags field contains a positive value (step 736). If the Skip Traffic Flags field contains a positive value ("Yes" path out of the decision step 736), then the mobile station reads the remainder of the frame (step 740), in accordance with availability state procedures, and returns to the unavailability state of the sleep mode (step 708). If, however, the Skip Traffic Flag field includes a negative value ("No" path out of decision step 736), then the mobile station determines whether there is a binary notification for the particular mobile station (step 738). If there is not a binary mode notification for the mobile station ("No" path out of decision step 738), then the mobile station returns to the unavailability state of the sleep mode operation (step 708). If, however, there is a binary notification for the mobile station ("Yes" path out of decision step 738), then the mobile station reads the remainder of the frame (step 740) and returns to the unavailability state of the sleep mode operation.

The information element of the present invention can reduce power consumption by battery powered stations. This power saving provides more flexibility in network design. For example, the power savings provided by the present invention can allow for shortened paging cycles. Typically, paging cycles are designed to balance fast call setup (which requires shorter paging cycles) and power savings (which typically requires longer paging cycles). Because of the reduced processing provided by the indicator of the present invention, a mobile station can be assigned longer unavailability intervals.

Although the present invention has been described as the indicators indicating that a traffic channel allocation or paging message is in the current frame, the present invention can instead indicate that the traffic channel allocation or paging message is in the next one or two frames. Additionally, although the present invention has been described as indicating that a configuration change or broadcast system update is occurring in a subsequent frame, the present invention can instead be used to indicate that the configuration change or broadcast system update is in a current frame.

Although the present invention has been described in connection with the IEEE 802.16e standard, the present invention is equally applicable to other types of OFDMA networks, such as those which employ Flarion Technologies Inc. Flash-OFDM technology, or other IEEE 802 standards. Additionally, the present invention can be employed in any type of wireless communication technology with an inactive states for mobile stations. Moreover, for the ease of explanation, the entities that read the indicator information element are described as mobile stations. However, the indicator information element can also be read and used by fixed wireless stations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for notifying mobile stations in an inactive state of information transmitted in a frame, comprising the acts of:
    determining whether particular broadcast information will be transmitted in the frame;
    determining whether information for at least one of the mobile stations in the inactive state will be transmitted in the frame;
    forming an information element notifying mobile stations in the inactive state whether the particular broadcast information or the information for the at least one of the mobile stations in the inactive state will be transmitted in the frame; and
    broadcasting the information element in a downlink portion of the frame,
    wherein
        the at least one of the mobile stations in the inactive state is in an idle mode, and the information for the mobile station in the idle mode is information related to a paging message, or
        the at least one of the mobile stations in the inactive state is in a sleep mode, and the information for the mobile station in the sleep mode is information related to a traffic channel assignment.

2. The method of claim 1, wherein when the information element notifies mobile stations in the inactive state that the particular broadcast information or the information for the at least one of the mobile stations in the inactive state will be transmitted in the frame, the particular broadcast information or the information for the at least one of the mobile stations in the inactive state is
    transmitted in the downlink portion of the frame.

3. The method of claim 2, wherein the information element is broadcast in a downlink MAP of the frame.

4. The method of claim 2, wherein the information element is broadcast in a dedicated physical channel in the frame.

5. The method of claim 2, wherein the particular broadcast information is an uplink or downlink configuration change.

6. The method of claim 2, wherein the particular broadcast information is a broadcast system update message.

7. The method of claim 2, wherein the information for the mobile station in the idle mode identifies that the information element includes additional information related to a paging message.

8. The method of claim 7, wherein the additional information indicates that the mobile station in the idle mode will receive a paging message in the frame.

9. The method of claim 2, wherein the information for the mobile station in the sleep mode identifies that the information element includes additional information related to the traffic channel assignment.

10. The method of claim 9, wherein the additional information indicates that the mobile station in the idle mode will receive a traffic channel assignment in the frame.

11. A method for determining whether a frame includes information for a mobile station in an inactive state, comprising the acts of:
    receiving a frame that includes a plurality of information elements;
    decoding an information element of the plurality of information elements;
    examining the information element to determine
        whether the information element identifies that particular broadcast information is in the frame or will be transmitted in a subsequent frame, and
        whether the information element identifies that information specific to the mobile station is in the frame,
    wherein when the information element identifies that the particular broadcast information is in the frame the mobile station decodes the particular broadcast information in the frame, and
    wherein when the information element identifies that information specific to the mobile station is in the frame the mobile station decodes the information specific to the mobile station in the frame.

12. The method of claim 11, wherein the information element is broadcast in a downlink MAP of the frame.

13. The method of claim 11, wherein the information element is broadcast in a dedicated physical channel in the frame.

14. The method of claim 11, wherein the particular broadcast information is an uplink or downlink configuration change.

15. The method of claim 11, wherein the particular broadcast information is a broadcast system update message.

16. The method of claim 11, wherein the mobile station in the inactive state is in an idle mode, and the information specific to the mobile station is information related to a paging message.

17. The method of claim 16, wherein the information specific to the mobile station identifies that the information element includes additional information related to a paging message.

18. The method of claim 17, wherein the additional information indicates that the mobile station will receive a paging message in the frame.

19. The method of claim 11, wherein the mobile station is in a sleep mode, and the information specific to the mobile station is information related to a traffic channel assignment.

20. The method of claim 19, wherein the information specific to the mobile station identifies that the information element includes additional information related to the traffic channel assignment.

21. The method of claim 20, wherein the additional information indicates that the mobile station will receive a traffic channel assignment in the frame.

22. The method of claim 11, wherein when the information element identifies that the frame does not include the particular broadcast information and the information specific to the mobile station, the mobile station discontinues processing a remainder of the frame and returns to the inactive state.

23. A method for determining whether a frame includes information for a mobile station in an inactive state, comprising the acts of:

receiving, by a mobile station in an inactive state, an information element in a downlink portion of the frame;

examining a first field of the information element to determine whether the information element includes additional information for at least one of a group of mobile stations in the inactive state; and when it is determined that the information element includes the additional information for the at least one of the group of mobile stations in the inactive state the mobile station examines a second field of the information element to determine whether the information element identifies the mobile station in the inactive state, wherein the second field indicates that a portion of the frame other than the information element includes information for the mobile station.

24. The method of claim 23, wherein the group of mobile stations in the inactive state are in an idle mode, and the second field identifies particular mobile stations of the group of mobile stations which are to receive paging messages in the frame.

25. The method of claim 23, wherein the group of mobile stations in the inactive state are in a sleep mode, and the second field identifies particular mobile stations of the group of inactive mobile stations which are to receive traffic channel assignments in the frame.

26. The method of claim 23, wherein the group of mobile stations in the inactive state include mobile stations in a sleep mode and an idle mode, the first field includes a field for identifying whether the second field includes information for at least one of the mobile stations in the idle mode and a field for identifying whether the second field includes information for at least one of the mobile stations in a sleep mode, and the second field identifies particular mobile stations of the sleep mode mobile stations which are to receive traffic channel assignments in the frame and identifies particular mobile stations of the idle mode mobile stations which are to receive paging messages in the frame.

27. The method of claim 23, wherein the information element is part of the frame.

28. The method of claim 23, wherein the information element is carried in a dedicated physical channel in the frame.

* * * * *